United States Patent
Duursma et al.

(10) Patent No.: US 6,538,667 B1
(45) Date of Patent: Mar. 25, 2003

(54) SYSTEM AND METHOD FOR PROVIDING IMMEDIATE VISUAL RESPONSE TO USER INPUT AT A CLIENT SYSTEM CONNECTED TO A COMPUTER SYSTEM BY A HIGH-LATENCY CONNECTION

(75) Inventors: Martin Duursma, West Pennant Hills (AU); Anatoliy Panasyuk, Thornleigh (AU)

(73) Assignee: Citrix Systems, Inc., Ft. Lauderdale, FL (US)

( * ) Notice: Subject to any disclaimer, the term of this patent is extended or adjusted under 35 U.S.C. 154(b) by 0 days.

(21) Appl. No.: 09/360,876

(22) Filed: Jul. 23, 1999

(51) Int. Cl.[7] ................................................. G09G 5/00
(52) U.S. Cl. ....................................... 345/740; 345/812
(58) Field of Search ................................ 345/744, 745, 345/748, 749, 789, 790, 703, 708–713, 760, 740–743, 853–854, 812, 816, 780; 709/232, 230; 707/10, 12

(56) References Cited

U.S. PATENT DOCUMENTS

| | | | |
|---|---|---|---|
| RE32,632 E | 3/1988 | Atkinson | 340/709 |
| 4,860,247 A | 8/1989 | Uchida et al. | 364/900 |
| 4,903,218 A | 2/1990 | Longo et al. | 364/521 |
| 4,937,036 A | 6/1990 | Beard et al. | 340/706 |
| 4,949,281 A | 8/1990 | Hillenbrand et al. | 364/518 |
| 4,958,303 A | 9/1990 | Assarpour et al. | 364/521 |
| 5,072,412 A | 12/1991 | Henderson, Jr. et al. | 395/159 |
| 5,103,303 A | 4/1992 | Shoji et al. | 358/75 |
| 5,119,319 A | 6/1992 | Tanenbaum | 364/514 |
| 5,231,697 A | 7/1993 | Yamada | 395/142 |
| 5,309,555 A | 5/1994 | Akins et al. | 395/157 |
| 5,351,129 A | 9/1994 | Lai | 348/584 |
| 5,414,457 A | 5/1995 | Kadowaki et al. | 348/14 |
| 5,469,540 A | 11/1995 | Powers, III et al. | 395/158 |
| 5,579,469 A | 11/1996 | Pike | 395/326 |
| 5,583,763 A * | 12/1996 | Atchenson et al. | 345/812 |
| 5,757,925 A | 5/1998 | Faybishenko | 380/49 |
| 5,802,292 A * | 9/1998 | Mogul | 345/744 |
| 5,805,815 A * | 9/1998 | Hill | 345/744 |

(List continued on next page.)

FOREIGN PATENT DOCUMENTS

| | | | |
|---|---|---|---|
| EP | 0836145 A2 | 4/1998 | G06F/17/30 |
| JP | 06125363 | 5/1994 | H04L/12/56 |
| WO | WO 97/28623 | 8/1997 | G06F/9/455 |

OTHER PUBLICATIONS

"Mechanisms for Finding Substitute Fonts in a Conference–Enabled X–Windows Application," IBM Technincal Disclosure Bulletin, IBM Corp. N.Y., vol. 41, No. 1, 1998, pp. 137–142.

*Primary Examiner*—Steven Sax
(74) *Attorney, Agent, or Firm*—Testa, Hurwitz & Thibeault, LLP

(57) ABSTRACT

A method and an apparatus for reducing perceived visual response to user input at a client node are described. The client node remotely executes an application program on a server node wherein all execution of the application program occurs on the server node. The client node transmits user-provided input to the server node, and the user-provided input elicits a response from the server node that is transmitted back to the client node for display. The client node receives the user input to be transmitted to the server node. The client node can obtain the user input through a keyboard or a pointing device. In response to the user input, the client node produces a prediction of a server response to the user input. The client node then displays the prediction. The display of the prediction provides the client user with a faster visual response to the user input than could be obtained from the server node. Upon receiving the server response, the client node displays the server response, overwriting the prediction.

20 Claims, 4 Drawing Sheets

U.S. PATENT DOCUMENTS

| | | | |
|---|---|---|---|
| 5,874,960 A | 2/1999 | Mairs et al. | 345/340 |
| 5,982,351 A * | 11/1999 | White et al. | 345/812 |
| 6,078,740 A * | 6/2000 | DeTreville | 345/740 |
| 6,108,493 A * | 8/2000 | Miller et al. | 345/740 |
| 6,178,461 B1 * | 1/2001 | Chan et al. | 709/247 |
| 6,182,125 B1 * | 1/2001 | Borella et al. | 709/218 |
| 6,243,761 B1 * | 6/2001 | Mogul et al. | 709/246 |
| 6,282,542 B1 * | 8/2001 | Carneal et al. | 707/10 |
| 6,304,909 B1 * | 10/2001 | Mullaly et al. | 709/232 |
| 6,353,452 B1 * | 3/2002 | Hamada et al. | 345/825 |

* cited by examiner

SYSTEM AND METHOD FOR PROVIDING IMMEDIATE VISUAL RESPONSE TO USER INPUT AT A CLIENT SYSTEM CONNECTED TO A COMPUTER SYSTEM BY A HIGH-LATENCY CONNECTION

FIELD OF THE INVENTION

The invention relates generally to client-server computer networks. More specifically, the invention relates to a system and method for providing feedback to user input at a client system.

BACKGROUND OF THE INVENTION

Typical computer networks include client systems that communicate with server systems over communication links. Often a user of the client system formulates and delivers queries to the server system through a user interface operating on the client system. The server system evaluates the queries and delivers responses to the client system for display on the client user interface.

Over the past decade, a wide variety of computer networks, such as local area networks (LANs), wide area networks (WANs), Intranets, and the Internet, have adopted remote application processing. In a remote application process system, all application program execution occurs on the server system, and only the control information for the client user interface, keystrokes, and mouse movements travel across the network. As a result, less resources of the client systems are needed to run applications.

A shortcoming of remote application processing, however, is that the client system may experience an unacceptable round-trip delay (i.e., latency) from when the client system sends input to the server system until the client system receives a response. Such delays can manifest themselves in remote computing environments, such as those encountered on the Internet, WANs, or satellite links, or with multi-user server systems. Regarding remote computing environments, the geographical separation of the client system from the server system produces the delay. This can be particularly troublesome to a user who is typing, for example, at the client system. The time required for the client input to travel to the server system and for the server response to return to the client system causes a palpable delay that can disconcert the user and induce typing errors. In multi-user server systems, the round-trip delay may depend more upon the ability of a busy server system, concurrently processing user interface data for multiple active clients, to respond to input received from a particular client system.

Consequently, the benefits of current remote computing and multi-user technologies are diminished for those implementations where the round-trip response time is greater than the acceptable user interface response time. Thus, a need exists for a system and a method that minimizes the delay sensed by the user of a client system in remote computing and multi-user computer system networks.

SUMMARY

The invention features a method and an apparatus for reducing perceived visual response to user input at a client node that is remotely executing an application program on a server node wherein execution of the application program occurs on the server node. The client node transmits the user input to the server node, and the user input elicits a response from the server node that is transmitted back to the client node for display.

In one aspect, the invention features a method that comprises receiving user input to be transmitted to the server node. In response to the user input, a prediction of a server response to the user input is produced. This prediction is then displayed at the client node. The prediction can be determined based upon information about the applications currently running on the server. Relevant information includes cursor position, font, and other types of data.

In another aspect, the invention features a client node comprising an input device that provides user input to be transmitted to a server node, a processor that produces a prediction of a server response to the user input, and a display device that displays the prediction. The input device can be a keyboard or a pointing device.

In still another aspect, the invention features a client-server system comprising a server node and a client node. The client node includes an input device for providing user input, a processor, and a display device. The processor transmits the user input to the server node and produces, in response to the user input, a client response that attempts to anticipate a server response to the user input by the server node. The client response provides a visual response to the user input before the client node receives the server response. The displayed server response overwrites the prediction.

BRIEF DESCRIPTION OF THE DRAWINGS

The invention is pointed out with particularity in the appended claims. The above and further advantages of the invention may be better understood by referring to the following description in conjunction with the accompanying drawings, in which:

DESCRIPTION OF THE INVENTION

Figure 1:
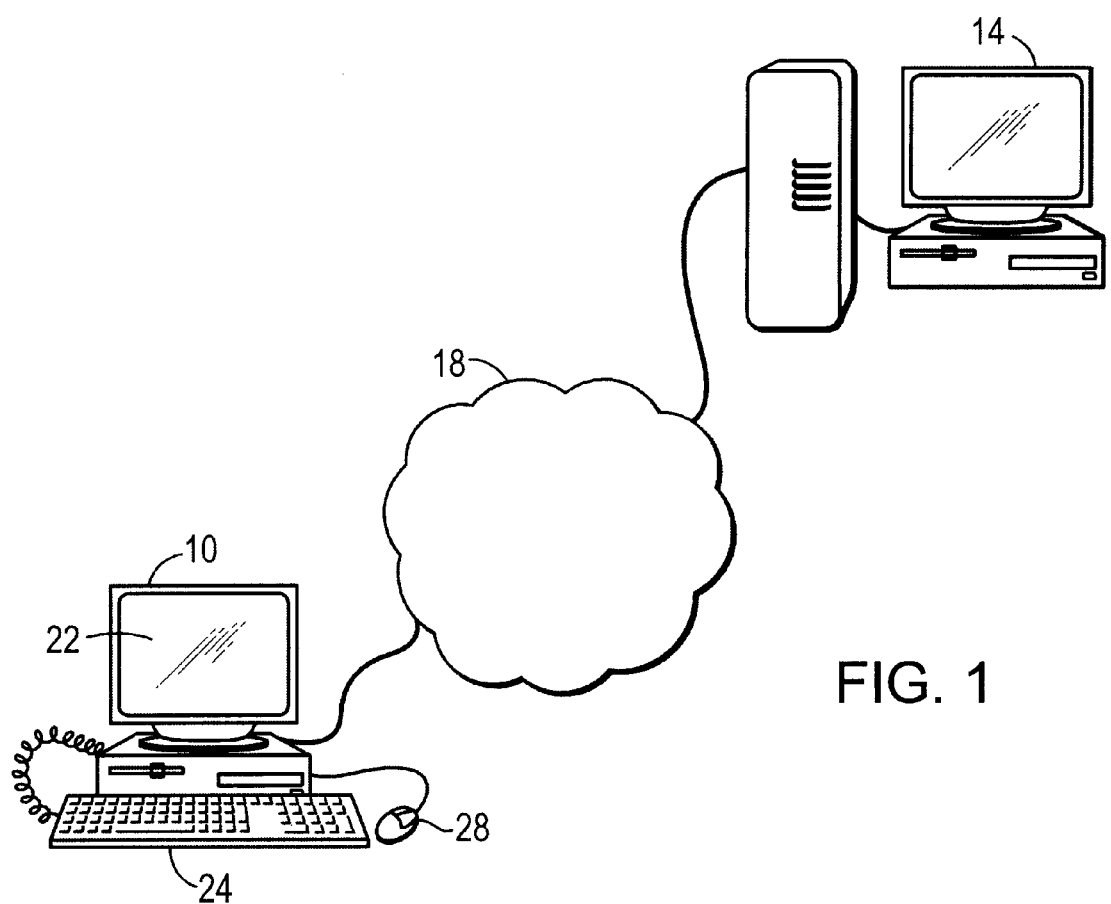
FIG. 1 is a diagram of an embodiment of a client system in communication with a server node over a network.

FIG. 1 shows a first computing system (client node) 10 in communication with a second computing system (server node) 14 over a communications network 18 for remotely executing an application program on the server node 14 in accordance with the principles of the invention. The network 18 over which the client and server nodes 10, 14 communicate can be a local area network (LAN) or a wide area network (WAN) such as the Internet. The client and server nodes 10, 14 can connect to the network 18 through a variety of connections including standard telephone lines, LAN or WAN links (e.g., T1, T3, 56 kb, X.25), broadband connections (ISDN, Frame Relay, ATM), and wireless connections. Connections can be established using a variety of communication protocols (e.g.,.TCP/IP, IPX, SPX, NetBIOS, Ethernet, RS232, and direct asynchronous connections). Other client nodes and server nodes (not shown) may also be connected to the network 18.

In one embodiment, the client node 10 communicates with the server node 14 using an Independent Computing Architecture (ICA) protocol developed by Citrix Systems, Inc. of Ft. Lauderdale, Fla. ICA is a general-purpose presentation services protocol that controls the input/output between the client node 10 and server node 14. The design of ICA is for the presentation services to run over industry standard network protocols, such as TCP/IP, IPX/SPX, or NetBEUI, using industry-standard transport protocols, including but not limited to ISDN, frame relay, and asynchronous transfer mode (ATM).

With the ICA protocol, all application execution remains on the server node 14, and only user interface information, such as windows application screen presentation, full-screen text presentation, and keyboard and pointing device updates, are sent to the client node 10. The technique of the invention operates as a feature that accelerates standard ICA keyboard processing. If a particular application program or input control cannot support the technique, the standard ICA keyboard processing is used. Other embodiments can employ other remote control protocols, such as MICROSOFT RDP (Remote Desktop Protocol), to practice the principles of the invention.

The client node 10 can be any personal computer (e.g., 286, 386, 486, Pentium, Pentium II, Macintosh computer), thin-client device, windows and non-windows based terminal, network computer, wireless device, information appliance, RISC Power PC, X-device, workstation, mini computer, main frame computer, or any processor-based device capable of displaying application data and operating according to a protocol that transmits input data to an application program executing remotely on the sever node 14.

The user interface displayed at the client node 10 can be text driven (e.g., the DOS operating system manufactured by Microsoft Corporation of Redmond, Wash.) or graphically driven (e.g., the WINDOWS operating system manufactured by Microsoft Corporation of Redmond, Wash.). The operating system of the client node 10 can be one of a variety of platforms including but not limited to WINDOWS 3.x, WINDOWS 95, WINDOWS 98, WINDOWS NT 3.51, WINDOWS NT 4.0, Macintosh, Java, and Unix, DOS, Linux, and WINDOWS CE for windows-based terminals. The client node 10 includes a display screen 22, a keyboard 24, a pointing device (e.g., a mouse, trackball, touch-pad, touch-screen, etc) 28, a processor (not shown), and persistent storage (not shown).

The server node 14 can be any computing device that controls access to other portions of the network (e.g., workstations, printers, etc.) and runs applications in response to input received from the client node 10. Like the client node 10, the server node 14 can support a variety of operating system platforms, such as, for example, WINDOWS 3.x, WINDOWS 95, WINDOWS 98, WINDOWS NT 3.51, WINDOWS NT 4.0, WINDOWS CE for windows-based terminals, Macintosh, Java, and Unix. The server node 14 can include a group of server systems logically acting as a single server system, called a server farm. In one embodiment, the server node 14 is a multi-user server system supporting multiple concurrently active client nodes.

The server node 14 hosts one or more application programs that can be accessed by the client node 10. Examples of such applications include browser software, e.g., MICROSOFT INTERNET EXPLORER™, word processing programs such as MICROSOFT WORD® and MICROSOFT NOTEPAD®, database programs such as MICROSOFT ACCESS®, and spreadsheet programs such as MICROSOFT EXCEL®, all of which are manufactured by Microsoft Corporation of Redmond, Wash.

Such application programs call application program interface (API) routines to direct the performance of the operating system running on the server node 14. Server-side support may make use of the Active Accessibility API, developed by Microsoft Corporation of Redmond, Wash., or equivalent proprietary APIs that allow information about the contents of a window to be extracted from the application in control of that window. For example, the Active Accessibility API models user interface elements as Component Object Model (COM) objects. A client is able to examine the properties of an object using provided functions such as Iaccessible::accLocation and IAccessible::get_accName. The foregoing examples are intended to be illustrative and not exhaustive.

In brief overview, the client node 10 communicates with the server node 14 to remotely execute an application program on the server node 14. User input supplied at the client node 10 serves as input to the application program. All execution of the application program occurs on the server node 14 according to this user input forwarded to the server node 14 from the client node 10. Examples of user input, typically submitted by a user of the client node 10, include characters entered through the keyboard 24 or cursor movements submitted using the pointing device 28.

In response to the user input, the server node 14 produces a server response that controls the content and appearance of the screen display of the client node 10 when subsequently transmitted to and received by the client node 10. The type of the server response depends on the type of the user input received and the application program that is processing the user input. For example, if the application program is a word processor and the input event is a keyboard input of the character "T," then the response from the server node 14 to the client node 10 produces the character "T" when displayed on the client node 10. The response can include information that defines the display of the character "T" on the screen of the client node 10, including current input position information and font information. Similarly, for example, if the user input is instead a pointing device operation (e.g., a cursor movement) that selects a toolbar icon, then the server response can display a drop-down menu associated with that icon on the screen 22 of the client node 10.

The period of elapsed time for the user input to traverse the network 18 to the server node 14 and for the server response to return to the client node 10 is the latency of the connection between the nodes 10, 14. When the client node 10 and server node 14 are communicating over a high-latency connection, the user may experience a palpable delay from the moment of entering the input until the moment of receiving a server response. Such high-latency connections are common in a WAN or Internet environment and can occur in multi-user computer systems that are busy responding to queries from multiple active clients.

To mitigate the effects of such latency, the client node 10 produces and displays a response to the input event in anticipation of the server response. According to the principles of the invention, the client node 10 response attempts to anticipate the server response that substantially matches, in content and appearance, the subsequent display of the expected server response. Content, for example, includes the specific text and graphical image that the server response is expected to display, such as the capital letter "T" and the drop-down menu of the above-described examples. Attributes associated with appearance include, for example, the color of the displayed character (e.g., blue), the font size (e.g., 12), the font type (e.g., Times New Roman), the font style (e.g., italics), and current input position (i.e., (x, y) coordinate) on the display screen 22.

Generating a Client Response

Figure 2:
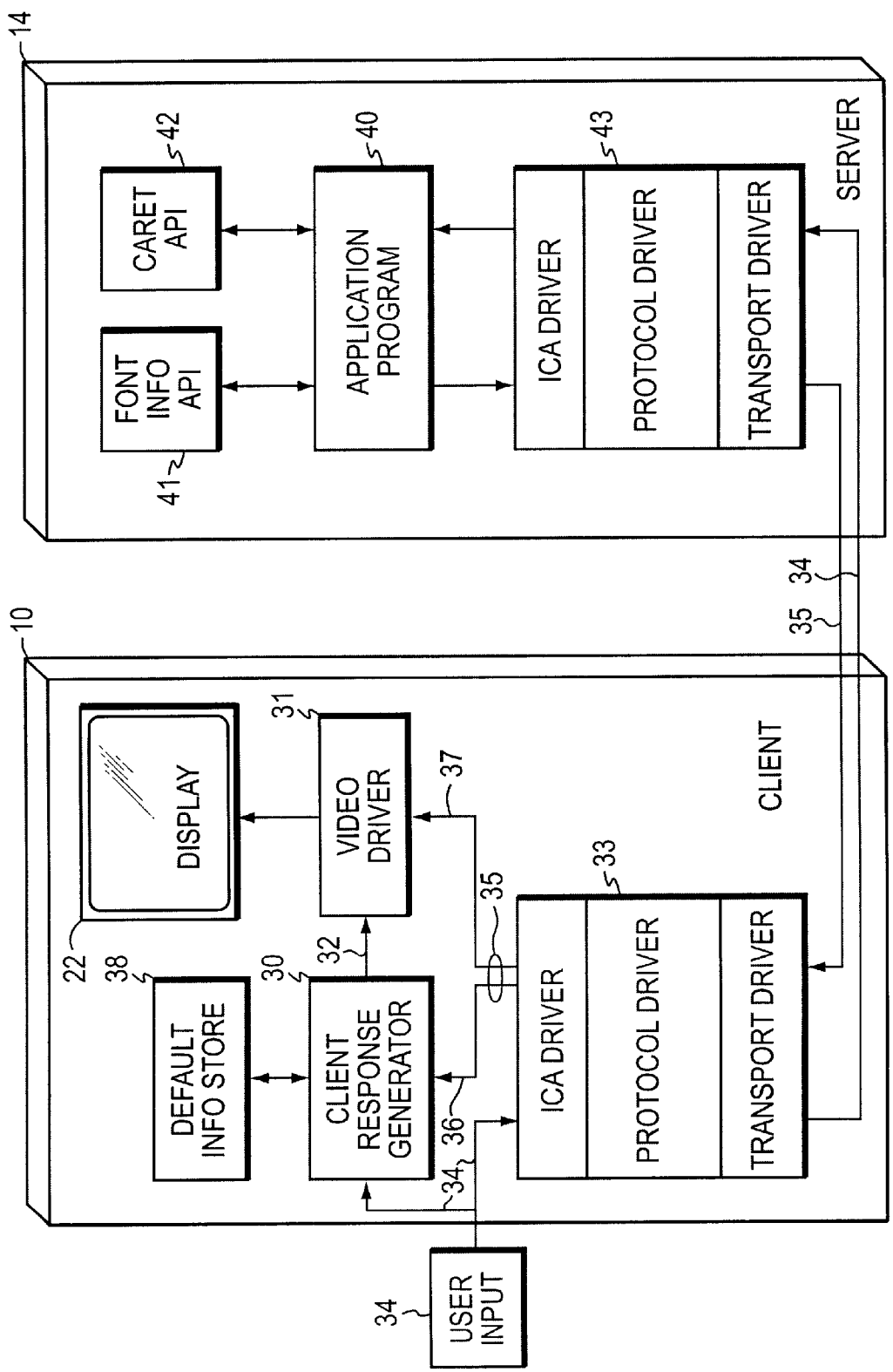
FIG. 2 is a block diagram of a client-server system showing the communication paths between the client and server when performing the methods of the present invention.

FIG. 2 shows an exemplary block diagram illustrating the information used by a client response generator 30 to produce a client response 32 to a user-supplied input 34. The client response generator 30 includes the processor of the client node 10 and the particular API routines that form and display the client-generated response 32. Typically, the client response generator 30 forms the client-generated response 32 based upon that user-supplied input 34 and upon server-supplied information 36, but if certain server-supplied information described below is unavailable, the client response generator 30 can use default information 38 instead.

The user-supplied input 34 is one of at least two types: (1) keyboard input or (2) a pointing device input. The user of the client node 10 supplies keyboard input by typing in characters using the keyboard and pointing device input by clicking or double-clicking the pointing device 28. Another type of pointing device input is the position of the cursor on the display screen 22 of the client node 10. User-supplied input is transmitted to the server 14 via a client-side transport mechanism 33. In the embodiment depicted in FIG. 2, the client-side transport mechanism 33 includes a transport driver that handles low-level network communication (e.g., physical layer), a protocol driver that handles higher-level network communication (e.g. data link layer), and an ICA driver that handles formatting of data to conform to the ICA protocol.

The type of server-supplied information 36 depends on the type of user input. As described above, the input types include keyboard input and pointing device input. For keyboard input, the server-supplied information 36 includes a current input position and current font information. The current input position is determined by current cursor position. The font information defines the appearance (e.g., font size, style, color, type, etc.) of the client-generated response when displayed on the display screen.

For pointing device input, the server-supplied information 36 includes current input position information, as described above, and current screen object information. For example, if the current screen object is a menu, the screen object information includes such information as menu size and screen location, number of menu elements, and size of menu elements. Here, the current input position information corresponds to the cursor position determined by the pointing input device.

The server node 14 obtains the current input position, font, and screen object information from the application program 40 executing on the server node 14. To provide current input position, the application program can use a standard operating system cursor handling routine or support a particular query API that obtains the cursor information, such as the "font info" API 41 or the "caret" API 42 depicted in FIG. 2. Use of the standard operating system routine may require some modification to that routine to obtain the cursor information. For example, implementations using MICROSOFT WINDOWS can accomplish this by installing a hook procedure in the standard dynamic link library file User32.dll.

To provide the font information, the application program 40 either uses text output functions to draw the text in response to the keyboard input or supports a particular query API to obtain the font information. Should the application program not support an API that can provide font information, the client response generator 30 can use default information 38 to produce the client-generated response 32. For example, default information 38 for font can be predetermined or taken from the most recent, previous text output generated by the application program.

The application program 40 provides screen object information in a manner similar to providing current input position, that is, by using a system-supported routine for accessing such information or by supporting yet another particular query API, such as Iaccessible::accLocation mentioned above. Such query APIs can be standard API, such as APIs in the Active Accessibility interface developed by Microsoft, or proprietary APIs.

The type of server-supplied information 36 also depends on the operational state of the application program currently executing on the server node 14. For example, if the server node 14 is executing a word processing application program and the program is presently processing the input using Edit control, the client response generator 30 can anticipate how the server node 14 will process keyboard input while operating according to this set of controls. For embodiments implemented using the WINDOWS operating system, Edit control is standard and well documented. The behavior of the Edit control is generally determined by a set of flags associated with the Edit control such as: ES_MULTILINE, which indicates that the control contains multiple lines of text; ES_NUMBER, which indicates that the control allows only digits to be entered; ES_CENTER, which indicates that the entered text will be centered; or ES_LOWERCASE, which indicates that the entered text will be converted to lower case. Other information can be obtained by querying the Edit control, such as the current size of the output rectangle, the currently selected font, the current line, or the current text selection in the Edit control. Thus, the client response generator 30 can anticipate a number of characteristics associated with, for example, text that is currently being edited in order to estimate the server response. In one embodiment, the client response generator 30 monitors the control by using a hooking control procedure. If the Edit control changes its state as a result of the user input or application request, the change is detected by the installed hook procedure and the updated information is communicated to the client.

It should be understood that the technique of estimation is not limited to Edit control or any particular set of controls, but that the technique can apply to any type of input control as long as cursor (caret) information is available to the client response generator 30. Optionally, the technique may require that font information also be available to the client response generator 30.

The server node 14 can send the server-supplied information 36 to the client node 10 at various points during the execution of the application program depending upon the type of application program. In some embodiments, the server node 14 periodically sends information to the client 10. In these embodiments, the server 14 may use a virtual channel set up using the ICA protocol to transmit the information. In other embodiments, the client 10 requests information from the server 14 at opportune times, such as periods of low network bandwidth usage or low processor loading. One point at which the client 10 may request information is when the server node 14 starts executing the application program 40. Here, the latency of the connection between the server 14 and client nodes 10 has minimal impact upon client user behavior because the client user has not yet begun to submit input to the application program 40. Other points can occur during the execution of the application program 40, such as, for example, when server node 14 transmits a server response to the client node 14. Still other points can be when certain trigger events occur during the execution of the application program 40, such as, for example, when the client user moves from one input field to another while entering data in a database record. Here, each time the client user advances to a new input field, the server node 14 can transmit to the client node the information 36 appropriate for that input field.

Figure 3:
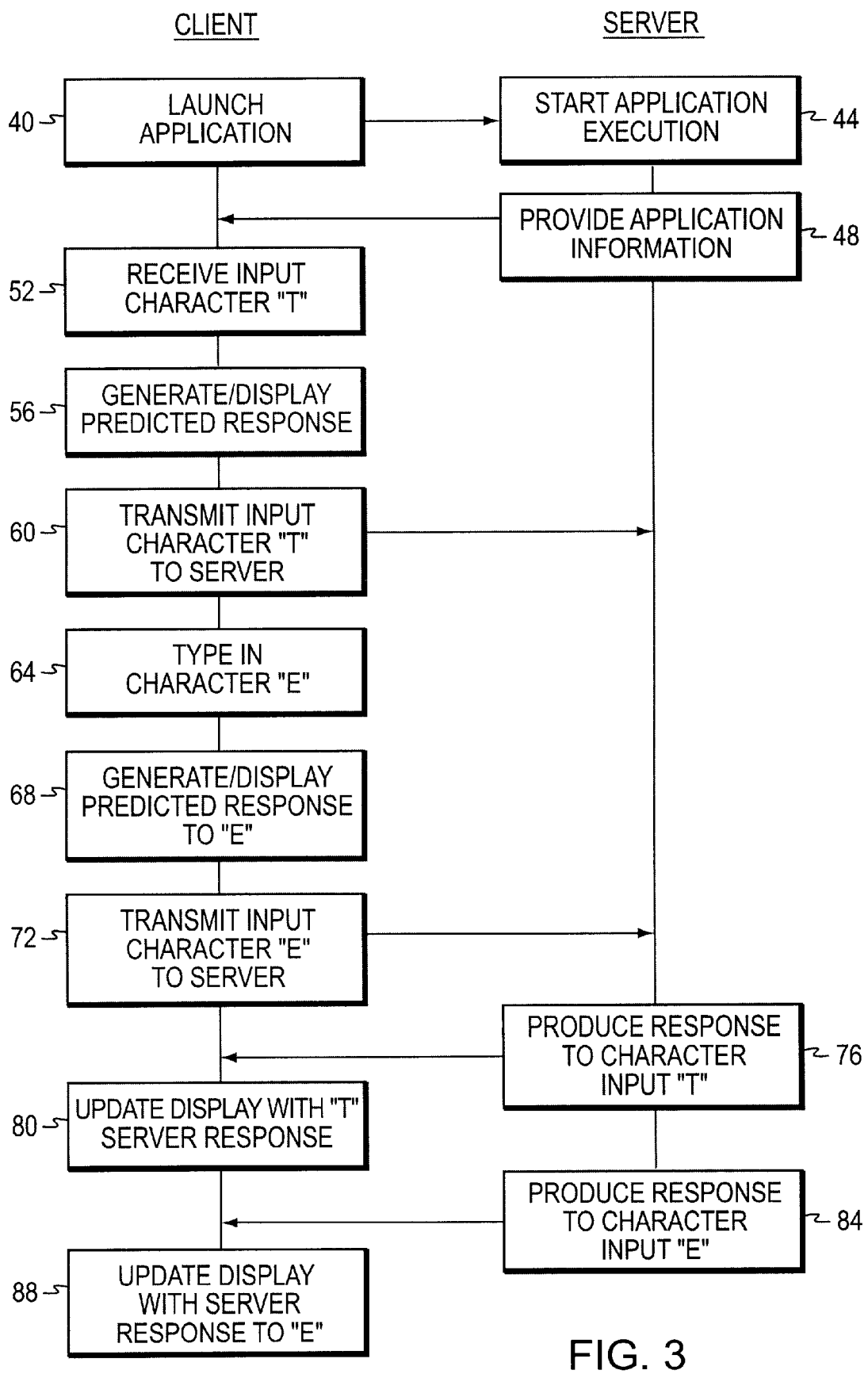
FIG. 3 is an exemplary flow diagram of an exemplary process by which the client node generates a response to keyboard input.

FIG. 3 shows an exemplary process of the invention by which the client node 10 and the server node 14 cooperate to give a client user an immediate visual response for each character typed in at the keyboard 24 by the client user. The responses appear character by character. Accordingly, the user should not visually discern any delay between the moment of supplying input to the moment of observing a response.

In brief overview, the client node 10 launches (step 40) an application program, and in response, the server node 14 starts (step 44) execution of that application. For illustration purposes only, the application program is MICROSOFT NOTEPAD, which uses a Multi-line Edit box within which characters typed in by the user appear. After starting execution of the application, the server node 14 transmits (step 48) application-specific information to the client node 10. This information includes at least font information and current input position information.

At the keyboard, the client user types in the capital letter "T." The client node 10 receives (step 52) this keyboard input, and then, as described above, generates and displays (step 56) a visual response that attempts to anticipate the server response. The client-generated response is more than a simple echo of the capital letter "T" because the client-generated response may also anticipate the visual attributes of the character, such as the font type, size, color, and current input position on the display screen. All of such visual attributes are obtainable from the information provided by the server in step 48. The client node 10 can use default information for any visual attributes not provided by the server node 14 with such application-specific information.

The client node 10 transmits (step 60) the input character "T" to the server node 14. Although shown here as occurring after the generation and display of the client-generated response, the transmission of the character to the server node 14 can occur before such generation and display. The client node receives (step 64) a second character typed in by the client user, here character "e." In a manner similar to the client-generated response for the letter "T," the client node 10 generates and displays (step 68) a response for the character "e" on the client display screen. In step 72, the client node 10 transmits the user input of the character "e" to the server node 14.

After sending the character input to the server node 14, the client node 10 monitors for a server response. The server node 14 produces (step 76) the response to the character input "T," and transmits the response to the client node 10 over the network 18. In general, the latency of the connection between the client and server nodes 10, 14 is longer than the time needed for the client node 10 to produce and display the client-generated response. Thus, the client-generated response may appear on the screen before the server node 14 generates the server response or receives the user input. Typically, the latency of the communications link between the server and client nodes is such that responses from the server node 14 lag behind responses displayed by the client node 10 by multiple characters, as is illustrated by this example.

The client node 10 receives the server response for the letter "T" and updates (step 80) the display by overwriting the client-generated response with the server response. Because the server response overwrites the client response, the server response does not need to exactly match the client-generated response. Slight differences in appearance between the client-generated response and the server response are usually indiscernible by the client user. In another embodiment, the client node 10 can compare the client-generated response with the server response and then overwrite the client-generated response if the server response differs.

The server node 14 produces (step 84) a response to the character input "e," and returns the response to the client node 10, which updates (step 88) the display screen with this server response. In some embodiments, the client node 10 updates the display screen regardless of whether the server-supplied response differs from the client-generated response. In other embodiments, the client node 10 updates the display with the server-supplied response only if the client-generated response was wrong. As noted above, along with each transmission of a server response from the server node 14 to the client node 10, the server node 14 can be providing new font and current input position information for use by the client node 10 to update subsequently generated client-generated responses.

Figure 4:
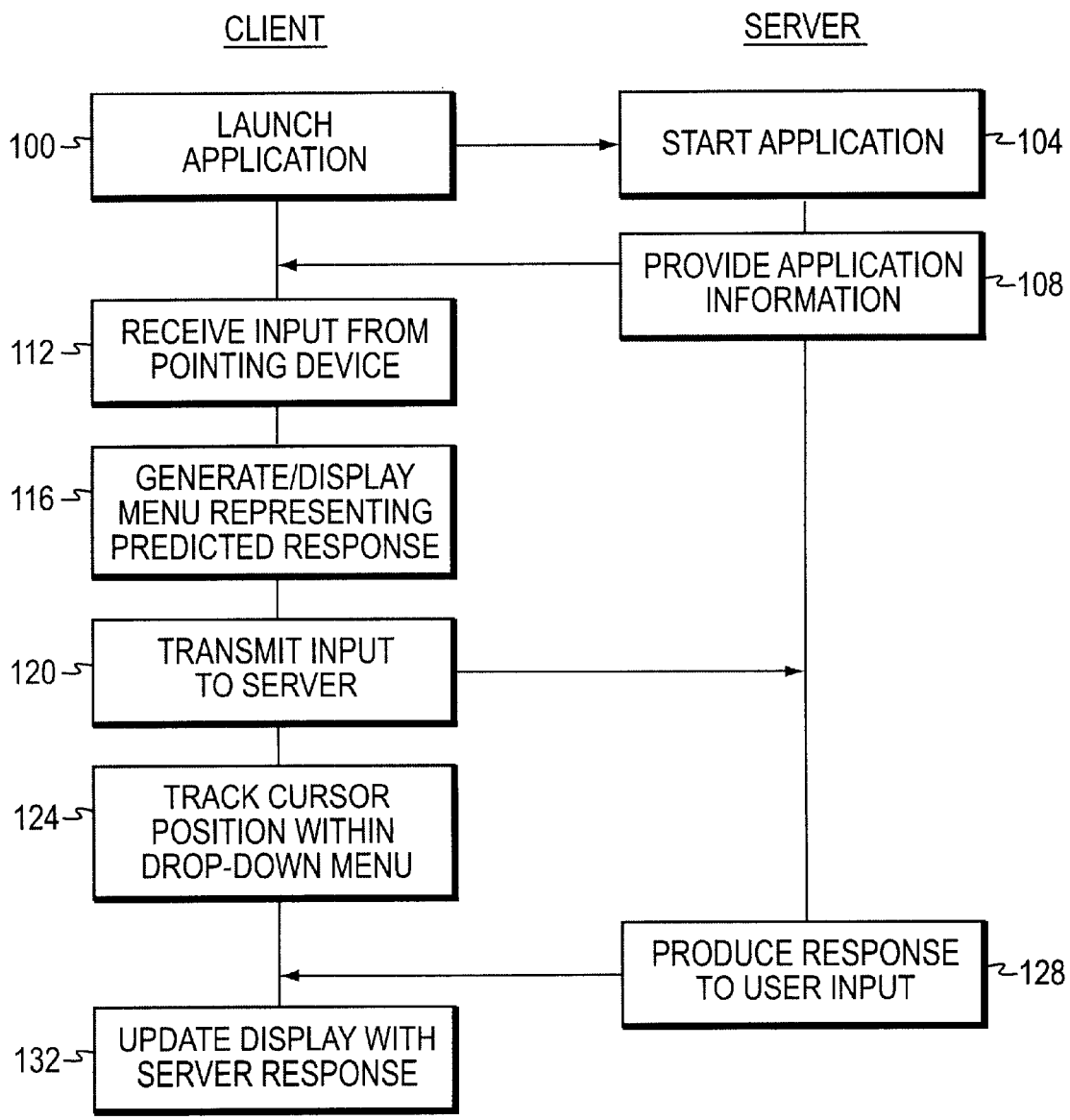
FIG. 4 is an exemplary flow diagram of an exemplary process by which the client node generates a response to user input provided through the pointing device.

FIG. 4 provides another exemplary flow diagram of the process by which the client node 10 generates responses to user input provided through the pointing device 28. As described for FIG. 3 above, the client node 10 launches (step 100) an application program that starts executing (step 104) on the server node 14. In this example, the server node 14 executes the MICROSOFT WORD application program.

As described in FIG. 3, the server node provides (step 108) application-specific information. Here, the application-specific information describes screen objects, such as the commands and toolbar icons that are displayed at the top of the MICROSOFT WORD window and the menu structure associated with each such screen object. The screen object information includes the screen position and screen area covered by each command and icon so that the client node 10 can generate, using the current cursor position, which command or icon is selected when the client user clicks the pointing device 28. For example, a typical display of commands at the top of the MICROSOFT WORD window is File Edit View Insert Format Tools Table Window Help. Activation of the Edit command, for example, occurs by clicking the pointing device 28 while the cursor position falls within the boundaries of the rectangular screen area covered by the Edit command. In step 112, the client node 10 receives this pointing device input. In anticipation of the server response, the client node 10 generates and displays (step 116) a response, here a drop-down menu associated with the Edit command, from the server-provided application-specific information and the current cursor position. The client node 10 transmits (step 120) the user input to the server node 14. In one embodiment, the client node 10 tracks (step 124) the cursor movement within the drop-down menu and highlights the menu item within which the current cursor position falls. In step 128, the server node 14 produces the actual response to the pointing device input and returns the response to the client node 10. The client node 10 updates (step 132) the display with the server response.

The present invention may be implemented as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPOM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

While the invention has been shown and described with reference to specific preferred embodiments, it should be understood by those skilled in the art that various changes in form and detail may be made therein without departing from the spirit and scope of the invention as defined by the following claims.

What is claimed is:

1. In a client-server system including a client node transmitting user-provided input to a server node having an application program executing thereon wherein the user-provided input elicits a response from the server node that is transmitted back to the client node for display, a method for reducing perceived response time to the user-provided input comprising the steps of:
    (a) receiving user input at the client node from an input device for input to the application program executing on the server node;
    (b) transmitting the user input to the application program executing on the server node over a communication link;
    (c) generating at the client node a prediction of the server response to the user input;
    (d) displaying the generated prediction of the server response on a display screen at the client node;
    (e) receiving a server response to the user input from the server node; and
    (f) replacing the generated prediction of the server response displayed on the display screen with the server response received from the server node.

2. The method of claim 1 wherein step (f) comprises overwriting the generated prediction of the server response on the display screen with the server response.

3. The method of claim 1 wherein the user input is first user input and further comprising the steps of:
    (g) receiving additional user input to be transmitted to the server node;
    (h) generating a second prediction of the server response to the additional user input; and
    (i) displaying the second prediction of the server response at the client node before receiving the server response to the first user input.

4. The method of claim 1 further comprising the step of receiving current input position information from the server node, and wherein step (c) comprises determining the prediction of the server response in response to the current input position information.

5. The method of claim 4 further comprising the step of providing font information for defining a visual characteristic of the prediction of the server response, and wherein step (c) further comprises determining the prediction of the server response in response to the font information.

6. The method of claim 1 further comprising the step of providing font information for defining a visual characteristic of the prediction of the server response, and wherein step (c) comprises determining the prediction of the server response in response to the font information.

7. The method of claim 6 further comprising the step of obtaining the font information from the server node.

8. The method of claim 6 wherein the step of providing the font information includes the step of obtaining default font information.

9. The method of claim 1 further comprising the step of receiving information about a screen object that is currently being manipulated by the client node; and executing a heuristic procedure responsive to the user input and the screen object information to generate the prediction of the server response.

10. In a client-server system including a client node transmitting user-provided input to a server node executing an application program wherein the user-provided input elicits a response from the server node that is transmitted back to the client node for display, a method for reducing perceived response time to the user-provided input comprising the steps of:
    (a) receiving user input at the client node from an input device for subsequent transmission to the application program executing on a server node;
    (b) generating at the client node in response to the user input a prediction of a server response to the user input by the server node;
    (c) displaying at the client node the prediction generated by the client node; and
    (d) replacing the generated prediction of the server node response displayed on the display screen with a server response received from the server node.

11. In a client-server system including a server node executing an application program according to user input supplied by a client node, wherein the user input elicits a response from the server node that is subsequently transmitted to the client node for display, a client node having reduced perceived response time to user input comprising:
    an input device for providing user input to the client node for transmission to the application program executing on the server node;
    a response generator in communication with the input device, the response generator generating at the client node and in response to the user input a prediction of a server response to the user input by the server node;
    a display device, in communication with the response generator, for displaying the prediction generated by the client node before the client node displays the response by the server node;
    a receiver receiving a server response to the user input from the server node; and
    a replacement module replacing the generated prediction of the server node response displayed on the display screen with the server response received from the server node.

12. An apparatus comprising:
    a server node executing an application program; and
    a client node in communication with the server node, the client node including (a) an input device for receiving user input to be transmitted to the application program executing on the server node, (b) a response generator for generating, at the client node, a client response to the user input that predicts a server response to the user input by the server node; (c) a display device for displaying the client response generated at the client to provide a visual response to the user input before displaying the server response; (d) a receiver receiving a server response to the user input from the server node; and (e) a replacement module replacing the generated prediction of the server node response displayed on the display screen with the server response received from the server node.

13. The apparatus of claim 12, further comprising a receiver receiving the server response to the user input from the server node.

14. The apparatus of claim 12, wherein the server response received from the server node further comprises current input position information.

15. The apparatus of claim 14, wherein the response generator generates the client response in response to the current input position information.

16. The apparatus of claim 12, wherein the server response received from the server node further comprises font information for defining a visual characteristic of the client response.

17. The apparatus of claim 12, wherein the response generator generates the client response in response to the font information.

18. The apparatus of claim 12, wherein the server response further comprises information about a screen object that is currently being manipulated by the client node.

19. The apparatus of claim 18, wherein the response generator executes a heuristic procedure responsive to the user input and the screen object information to generate the client response.

20. The apparatus of claim 12, wherein the display device further comprises displaying a second client response at the client node before receiving the server response to the first user input.

* * * * *